United States Patent
Jeong et al.

(10) Patent No.: US 11,474,571 B2
(45) Date of Patent: Oct. 18, 2022

(54) DISPLAY PANEL MODULE AND ELECTRONIC DEVICE INCLUDING MULTIPLE DISPLAY PANEL MODULES

(71) Applicant: SAMSUNG ELECTRONICS CO., LTD., Suwon-si (KR)

(72) Inventors: Seogyong Jeong, Suwon-si (KR);
Junhyeong Park, Suwon-si (KR);
Jaehyuck Shin, Suwon-si (KR);
Youngho Ryu, Suwon-si (KR);
Byeongguk Choi, Suwon-si (KR);
Sungku Yeo, Suwon-si (KR);
Chongmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/177,542

(22) Filed: Feb. 17, 2021

(65) Prior Publication Data

US 2021/0365082 A1 Nov. 25, 2021

Related U.S. Application Data

(60) Provisional application No. 63/026,889, filed on May 19, 2020.

(30) Foreign Application Priority Data

Nov. 19, 2020 (KR) .................. 10-2020-0155553

(51) Int. Cl.
*G06F 1/16* (2006.01)
*G06F 1/18* (2006.01)
(Continued)

(52) U.S. Cl.
CPC ............ *G06F 1/1698* (2013.01); *G06F 1/181* (2013.01); *G06F 1/189* (2013.01); *G06F 1/203* (2013.01); *G09F 9/33* (2013.01); *H02J 50/005* (2020.01)

(58) Field of Classification Search
CPC ........ G09F 9/3026; G09F 9/33; G06F 3/1446; G06F 1/1607; G06F 1/1698; G06F 1/181;
(Continued)

(56) References Cited

U.S. PATENT DOCUMENTS 5,949,581 A * 9/1999 Kurtenbach ............... G09F 9/33
359/623
6,314,669 B1 * 11/2001 Tucker .................. G09F 9/3026
345/82

(Continued)

FOREIGN PATENT DOCUMENTS

| KR | 10-2012-0071769 | 7/2012 |
| KR | 10-1464733 | 11/2014 |

(Continued)

OTHER PUBLICATIONS

International Search Report and Written Opinion dated Jul. 23, 2021 in corresponding International Application No. PCT/KR2021/004426.

*Primary Examiner* — Michael A Matey
(74) *Attorney, Agent, or Firm* — Nixon & Vanderhye, P.C.

(57) ABSTRACT

A display panel module and an electronic device is provided, the display pane module including a plurality of display panel modules. According to the disclosure, an electronic device comprises: a housing, a cover glass, a plurality of display panels disposed adjacent to a rear surface of the cover glass in the housing, a plurality of first heat dissipation plates disposed adjacent to rear surfaces of the plurality of display panels in the housing, a plurality of power/data
(Continued)

reception circuit boards disposed adjacent to rear surfaces of the plurality of first heat dissipation plates in the housing, a support configured to support at least a portion of the plurality of power/data reception circuit boards, and a power/data transmission circuit board having at least a portion contacting and supported by the support and spaced apart by a predetermined distance from the plurality of power/data reception circuit boards in a space provided by the support. The power/data transmission circuit board includes a plurality of first antennas corresponding to a plurality of second antennas included in each of the plurality of power/data reception circuit boards and a transmission resonator corresponding to a plurality of reception resonators included in each of the plurality of power/data reception circuit boards.

20 Claims, 14 Drawing Sheets

(51) Int. Cl.
 G06F 1/20 (2006.01)
 G09F 9/33 (2006.01)
 H02J 50/00 (2016.01)
(58) Field of Classification Search
 CPC ... G06F 1/189; G06F 1/203; G09G 2300/026; G09G 2370/16; H05K 5/0017; H05K 2201/10128; H05K 7/20954; H05K 7/20963; G02F 1/133603; G02F 1/133628; G02F 1/13336; G02F 1/133608; G02F 1/133308; G02F 1/133328; G02F 1/1333; G02F 1/133322; G02F 1/133354; G02F 1/133382; G02F 2201/46; H02J 50/12; H02J 50/10; H02J 50/80; H02J 50/23; H02J 50/40; H02J 50/402; H02J 50/005; H04B 5/0037; H04B 1/18; H04B 10/25891; H04B 17/12; H04B 5/0031; F28D 15/00; F28D 2021/0028; H01Q 1/243
 See application file for complete search history.

(56) References Cited

U.S. PATENT DOCUMENTS

| | | | | |
|---|---|---|---|---|
| 6,741,222 B1* | 5/2004 | Tucker | ............ | G09F 9/33 345/1.1 |
| 6,813,853 B1* | 11/2004 | Tucker | ............ | G09F 9/33 345/82 |
| 11,026,328 B2* | 6/2021 | Lee | ............ | H05K 1/0271 |
| 2008/0078733 A1* | 4/2008 | Nearman | ............ | G09F 9/3026 211/189 |
| 2008/0141570 A1* | 6/2008 | Nearman | ............ | G09F 9/30 40/574 |
| 2010/0315389 A1* | 12/2010 | Sorrell | ............ | H01Q 1/248 343/702 |
| 2011/0122048 A1* | 5/2011 | Choi | ............ | G09G 5/003 345/1.1 |
| 2011/0221995 A1* | 9/2011 | Park | ............ | G02F 1/13336 349/58 |
| 2012/0161531 A1* | 6/2012 | Kim | ............ | H02J 50/80 307/104 |
| 2013/0293443 A1* | 11/2013 | Seo | ............ | G06F 3/1446 345/1.2 |
| 2013/0316664 A1* | 11/2013 | Kim | ............ | H04N 5/64 455/90.1 |
| 2014/0029233 A1* | 1/2014 | Yanagida | ............ | H01F 27/366 361/818 |
| 2014/0062270 A1* | 3/2014 | Divona | ............ | A47B 81/06 29/525.01 |
| 2014/0117869 A1 | 5/2014 | Lee et al. | | |
| 2014/0306966 A1* | 10/2014 | Kuo | ............ | G06F 3/1446 345/522 |
| 2014/0375263 A1 | 12/2014 | Shionoiri et al. | | |
| 2015/0138634 A1* | 5/2015 | Kim | ............ | H04N 13/305 359/462 |
| 2015/0145892 A1* | 5/2015 | Hong | ............ | G06F 3/1446 345/649 |
| 2016/0210899 A1* | 7/2016 | Hyun | ............ | G09G 3/2085 |
| 2016/0266861 A1* | 9/2016 | Kim | ............ | H04N 9/3147 |
| 2016/0269114 A1 | 9/2016 | Beck | | |
| 2016/0315383 A1* | 10/2016 | Akuzawa | ............ | B60L 53/122 |
| 2017/0082267 A1* | 3/2017 | Gagne | ............ | G06F 3/1446 |
| 2017/0085005 A1* | 3/2017 | Aue | ............ | H04B 1/40 |
| 2018/0024801 A1* | 1/2018 | Chang | ............ | G06F 3/1446 345/1.3 |
| 2018/0026820 A1* | 1/2018 | Kim | ............ | H02J 50/20 375/259 |
| 2018/0060014 A1* | 3/2018 | Son | ............ | G06F 3/1431 |
| 2018/0132376 A1* | 5/2018 | Shin | ............ | H02J 7/02 |
| 2018/0198186 A1* | 7/2018 | Hwang | ............ | H01F 27/366 |
| 2018/0198305 A1* | 7/2018 | Hwang | ............ | H05K 9/0088 |
| 2018/0198310 A1* | 7/2018 | Hwang | ............ | H01F 27/36 |
| 2018/0358710 A1* | 12/2018 | To | ............ | H01Q 15/148 |
| 2019/0044391 A1* | 2/2019 | Jang | ............ | H01F 27/366 |
| 2019/0166704 A1* | 5/2019 | Shin | ............ | G02F 1/13336 |
| 2019/0180654 A1* | 6/2019 | Moosburger | ............ | H01L 33/58 |
| 2019/0180673 A1* | 6/2019 | Yoon | ............ | G06F 3/1446 |
| 2019/0325789 A1* | 10/2019 | Ting | ............ | H05K 1/028 |
| 2020/0020276 A1 | 1/2020 | Cho et al. | | |
| 2020/0111391 A1* | 4/2020 | Chao | ............ | G02B 6/4298 |
| 2020/0220041 A1* | 7/2020 | Kim | ............ | G09F 9/3026 |
| 2020/0375041 A1* | 11/2020 | Lee | ............ | F16M 13/02 |
| 2020/0411990 A1* | 12/2020 | Nakamura | ............ | H02J 50/402 |
| 2021/0050486 A1* | 2/2021 | Li | ............ | G09G 5/36 |

FOREIGN PATENT DOCUMENTS

| | | |
|---|---|---|
| KR | 10-2016-0058868 | 5/2016 |
| KR | 10-2018-0010057 | 1/2018 |
| WO | 2014/061987 | 4/2014 |

* cited by examiner

DISPLAY PANEL MODULE AND ELECTRONIC DEVICE INCLUDING MULTIPLE DISPLAY PANEL MODULES

CROSS-REFERENCE TO RELATED APPLICATIONS

This application is based on and claims priority under 35 U.S.C. § 119 to U.S. Provisional Patent Application No. 63/026,889, filed on May 19, 2020, in the United States Patent and Trademark Office, and Korean Patent Application No. 10-2020-0155553, filed on Nov. 19, 2020, in the Korean Intellectual Property Office, the disclosures of which are incorporated by reference herein in their entireties.

BACKGROUND

Field

The disclosure relates to a display panel module and an electronic device including a plurality of display panel modules.

Description of Related Art

With the development of semiconductor technology, various types of display devices are being developed. For example, various types of display devices form a display screen by forming matrices with light emitting diodes (LEDs) or liquid crystal display (LCD) devices or similar devices. Advancing technology leads to an increase in display size and the release of products that deliver superior quality and resolution.

A type of fast-growing display is the micro LED (μLED) display which joins multiple display panels into a single large display screen.

A typical micro LED display has a multi-layered structure and uses thick cables and a number of connectors to transmit power and data.

For example, a large number of cables are required to transmit display image data and power from one transmission circuit board to the plurality of display panels, which complicates the configuration of the display and thickens the display. Further, since one transmission circuit board and multiple display panel modules need to be wired together, it may be difficult to modularize the display panels and efficiently use the space.

SUMMARY

Embodiments of the disclosure may provide a display panel module that includes a transmission resonator capable of wirelessly transmitting power to a transmission circuit board and may reduce the thickness of the display device by wirelessly transmitting power to a plurality of reception resonators included in the plurality of display panels from one transmission resonator and an electronic device including a plurality of display panel modules.

According to various example embodiments, a display panel module may include: a plurality of transmission antennas configured to wirelessly transmit data to a transmission circuit board and to wirelessly transmit image data to each of a plurality of reception antennas included in a plurality of display panels from each transmission antenna and an electronic device including a plurality of display panel modules.

According to an example embodiment, an electronic device comprises: a housing, a cover glass, a plurality of display panels disposed adjacent to a rear surface of the cover glass in the housing, a plurality of first heat dissipation plates disposed on rear surfaces of the plurality of display panels in the housing, a plurality of power/data reception circuit boards disposed on rear surfaces of the plurality of first heat dissipation plates in the housing, a support configured to support at least a portion of the plurality of power/data reception circuit boards, and a power/data transmission circuit board having at least a portion contacting and supported by the support and spaced apart by a predetermined distance from the plurality of power/data reception circuit boards in a space provided by the support. The power/data transmission circuit board includes a plurality of first antennas corresponding to a plurality of second antennas individually included in the plurality of power/data reception circuit boards and a transmission resonator corresponding to a plurality of reception resonators individually included in the plurality of power/data reception circuit boards.

According to an example embodiment, a display panel module comprises: a display panel, a first heat dissipation plate disposed on a rear surface of the display panel, and a power/data reception circuit board disposed on a rear surface of the first heat dissipation plate. The power/data reception circuit board includes an antenna and a reception resonator.

According to various example embodiments, a display panel module and an electronic device including a plurality of display panel modules allow for an ultra-slim display and efficient space usage by wirelessly transmitting power and data from the transmission circuit board of the micro display to the plurality of display panels.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure are described in greater detail with reference to the accompanying drawings. It should be noted that the same or similar reference numbers may be used to refer to the same elements throughout the disclosure. When making the disclosure unclear, the detailed description of known functions or configurations may be omitted.

Figure 1:
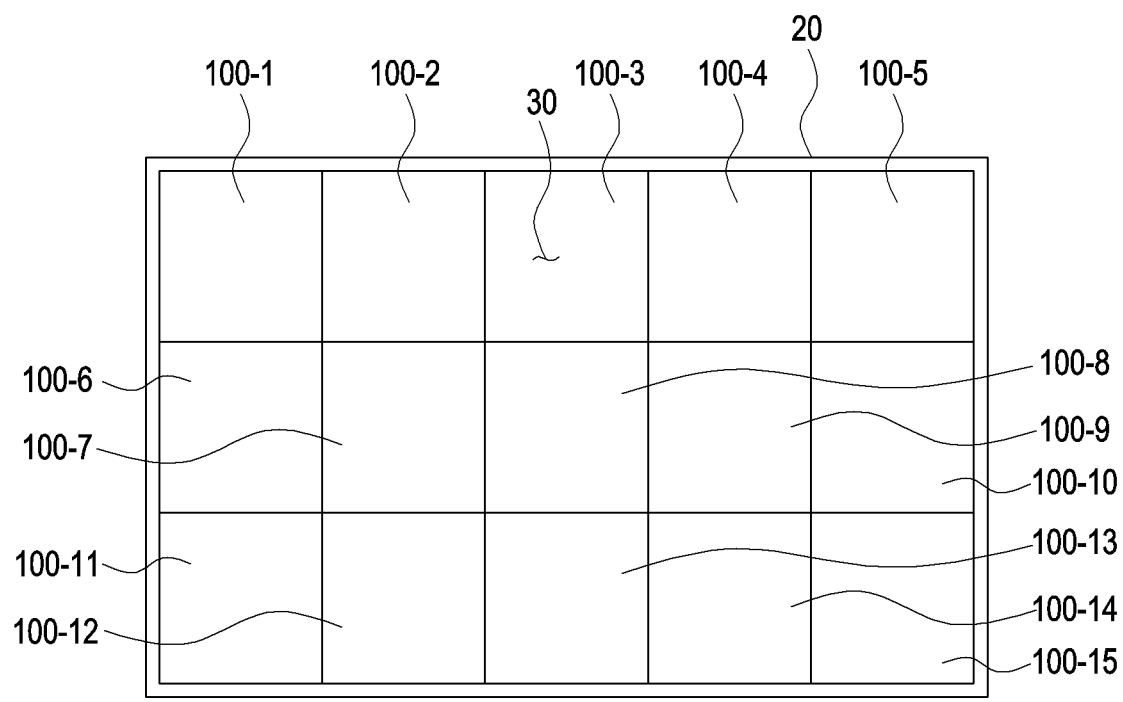
FIG. 1 is a diagram illustrating an example electronic device according to various embodiments.

FIG. 1 is a diagram illustrating an electronic device 10 according to various embodiments.

Referring to FIG. 1, according to an embodiment, an electronic device 10 (e.g., a display device) may be a multi-display device (or a modular display) that implements a screen by connecting a plurality of display panels. The multi-display device may be a device in which a large screen is implemented by connecting several display panels. According to an embodiment, the multi-display device may configure a large screen by connecting a plurality of flat panel display panels, such as liquid crystal displays (LCDs), field emission displays (FEDs), plasma display panels (PDPs), organic light-emitting diode (OLED) displays, or the like. An example of the multi-display device may be a large format TV display which implements a large screen by connecting several CRTs. Small portable devices, such as mobile phones, smart phones, personal digital assistants (PDAs), as well as home TVs, may also become a multi-display device by connecting multiple panels. Electronic devices according to various embodiments may include various electronic devices, such as electronic books, digital picture frames, digital whiteboards, electronic tables, large format displays (LFDs), tablets, desktops, laptops, and kiosks, as well as the above-described TVs, mobile phones, smart phones, PDAs, or the like.

The electronic device 10 may display one piece of content or simultaneously display a plurality of pieces of content through the entire screen. The electronic device 10 according to various embodiments may support a multi-view (or multi-vision) mode as well as a normal mode. The normal mode may be a mode in which one content is displayed, and the multi-view mode may be a mode in which multiple different contents are displayed.

As illustrated in FIG. 1, the electronic device 10 according to an embodiment may be implemented in a form in which a plurality of display modules 100-1, 100-2, 100-3, 100-4, 100-5, 100-6, 100-7, 100-8, 100-9, 100-10, 100-11, 100-12, 100-13, 100-14, 100-15 (which may be referred to hereinafter as 100-1, 100-2, 100-3, 100-4 . . . , etc.) are connected together. The plurality of display modules 100-1, 100-2, 100-3, 100-4 . . . may be arranged and connected to form one large screen, but each may be configured of a unit display panel module that is individually or selectively operated. Each of the plurality of display modules 100-1, 100-2, 100-3, 100-4 . . . may include a plurality of pixels. In particular, each of the plurality of pixels included in each display module 100-1, 100-2, 100-3, 100-4 . . . may, for example, be implemented as a micro LED (μLED) pixel, but is limited thereto. For example, the display module may be implemented as, e.g., a liquid crystal display (LCD), an organic LED (OLED), an active-matrix OLED (AMOLED), a plasma display panel (PDP), a quantum dot (QD), or the like. For convenience of description, it is assumed by way of non-limiting example below that each of the plurality of display modules 100-1, 100-2, 100-3, 100-4 . . . is implemented as a micro LED module.

According to the embodiment illustrated in FIG. 1, the number of display modules 100-1, 100-2, 100-3, 100-4 . . . or the reference denotations therefor are merely an example, and the scope of the disclosure is not limited thereto. Unlike in FIG. 1, the electronic device 10 may include more or less plurality of display modules 100-1, 100-2, 100-3, 100-4 . . . .

Figure 2:
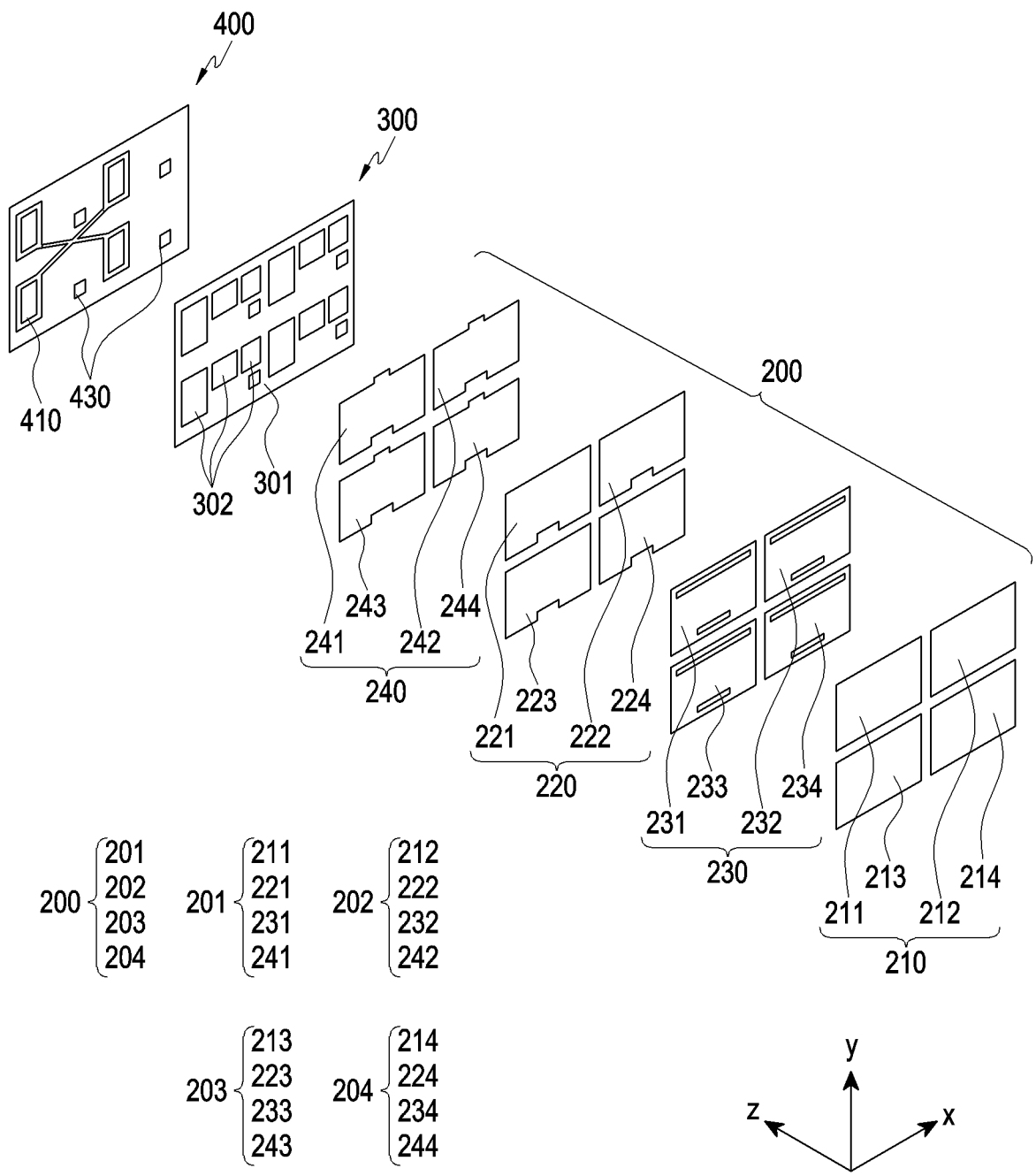
FIG. 2 is an exploded perspective view illustrating an example electronic device according to various embodiments.

Described below in connection with FIG. 2 is an embodiment in which among the plurality of display modules 100-1, 100-2, 100-3, 100-4 . . . a 2×2 array of display modules are included in one module set. However, it should be noted that this does not limit the scope of the disclosure. For example, referring to FIG. 2, a 2×2 array of display modules included in one display module set, and a power/data transmission circuit board (e.g., the power/data transmission circuit board 400 of FIG. 2 described below) and a supporting member (e.g., the supporting member 300 of FIG. 2 described below) are disposed in the positions corresponding to the 2×2 array of display modules of one display module set on one side of the electronic device 10. However, without limitations thereto, a 1×4 array, or N×M array, of display modules, although not shown, may be included one display module set, and the power/data transmission circuit board and supporting member may be disposed in the corresponding positions. According to an embodiment, the electronic device 10 may include a plurality of display module sets. Other various embodiments are also possible.

The electronic device 10 may include a housing 20 that provides a space in which the plurality of display modules 100-1, 100-2, 100-3, 100-4 . . . may be disposed and a cover glass 30 to protect the display modules. According to an embodiment, the housing 20 may surround at least part of the surroundings of the plurality of display modules 100-1, 100-2, 100-3, 100-4 . . . and accommodate a supporting member, a power/data transmission circuit board, and various electronic components. The cover glass 30 may be disposed on the front surface of the electronic device 10 to protect electronic components inside the electronic device 10 from external physical, chemical, or electric impacts, etc. FIG. 2 is an exploded perspective view illustrating an example electronic device according to various embodiments.

Referring to FIG. 2, an electronic device (e.g., the electronic device 10 of FIG. 1) may include a display panel module set 200, a supporting member (e.g., a support) 300, and a power/data transmission circuit board 400. The display panel module set 200 is disposed adjacent to the rear surface of the cover glass (for example, the cover glass 30 of FIG. 1), and the supporting member 300 and the power/data transmission circuit board 400 may be sequentially disposed following the display panel module set 200.

The display panel module set 200 may be connected to the power/data transmission circuit board 400 and be configured to transmit and receive power and/or data therebetween.

The 'connection' between the display panel module set 200 and the power/data transmission circuit board 400 may include a network connection. The network connection may refer, for example, to a state in which data may be transmitted/received or resources may be shared between two components. For example, the network connection may refer to a state in which two components are connected through wired or wireless communication. The two components may be connected to the network via a direct connection communication scheme (D2D, Device-to-Device) or via an indirect connection communication scheme in which the two devices are indirectly connected via a different device (e.g. an access point (AP) or router.

The 'connection' between the display panel module set 200 and the power/data transmission circuit board 400 may include a contactless connection. A more detailed description of the contactless connection is described below in greater detail with reference to FIG. 3.

The display panel module set 200 may include a plurality of components for transmitting/receiving data and/or power, and the plurality of components may be configured as modules, each including various components. The power/data transmission circuit board 400 may also include a plurality of components for transmitting/receiving data and/or power, and the plurality of components may also be configured as modules. The module may be a single integral component, or a minimum unit or part thereof, adapted to perform one or more functions.

The display panel module set 200 may include a plurality of display panel modules (e.g., a first display panel module 201, a second display panel module 202, a third display panel module 203, and a fourth display panel module 204). Each of the display panel modules 201, 202, 203, and 204 may include a display module 210, a first heat dissipation plate 220, and a power/data reception circuit board 240. The display module 210, the first heat dissipation plate 220, and the power/data receiving circuit board 240 may be sequentially disposed adjacent to the rear surface of the cover glass (e.g., cover glass 30 of FIG. 1). According to an embodiment, some of the aforementioned components may be omitted, or one or more other components may be further added to the display panel module set 200. For example, a second heat dissipation plate 230 including second heat dissipation plates 231, 232, 233, and 234 may be additionally provided between the display module 210 and the first heat dissipation plate 220.

The display panel module set 200 may include a plurality of display panel modules 201, 202, 203, and 204 as sub-modules. For example, as illustrated in FIG. 2, the display panel module set 200 may include a first display panel module 201, a second display panel module 202, a third display panel module 203, and a fourth display panel module 204. Here, a 2×2 array of sub modules is disclosed, but it should be noted that other various arrays may be provided. The first display panel module 201 may include a first display module 211, a 1-1th heat dissipation plate 221, and a first power/data reception circuit board 241. The second display panel module 202 may include a second display module 212, a 1-2th heat dissipation plate 222, and a second power/data reception circuit board 242. The third display panel module 203 may include a third display module 213, a 1-3th heat dissipation plate 223, and a third power/data reception circuit board 243. The fourth display panel module 204 may include a fourth display module 214, a 1-4th heat dissipation plate 224, and a fourth power/data receiving circuit board 244. As sub-modules, the components of each display panel module may be stacked one over another and may be electrically connected to each other. The plurality of display panel modules 201, 202, 203, and 204 may be arranged and connected to form a large screen. The plurality of display panel modules 201, 202, 203, and 204 may be interworked with each other by a processor included in the electronic device 10 to display one content through the entire screen, or are individually or selectively driven to provide a plurality of contents.

Each of the plurality of display panel modules 201, 202, 203, and 204 or each of the components of each display panel module may be physically separated from or integrally connected with its adjacent display panel module or adjacent component.

However, the display panel modules 201, 202, 203, and 204 or the components of the display panel module may be functionally separated from each other and may be independently or selectively controlled by the processor provided in the electronic device 10.

With the first display panel module 201, the components of each module are described below in greater detail.

The first display panel module 201 may include a first display module 211, a 1-1th heat dissipation plate 221, and a first power/data reception circuit board 241.

The first display module 211 is a portion corresponding to a main load that consumes power of the electronic device 10 and may include at least one light emitting device (e.g., a pixel). The first display module 211 may include a display panel and a display driver integrated circuit (IC) (DDI) for controlling the display panel. The DDI may receive image information that contains, e.g., image data or an image control signal corresponding to a command to control the image data from another component of the electronic device 10 via an interface. At least one light emitting element (e.g., pixel) included in the first display module 211 may be driven based on at least part of a voltage value or a current value corresponding to the image data, displaying visual information (e.g., text, image, or icon) corresponding to the image data through the display 210.

The 1-1th heat dissipation plate 221 may be disposed on the rear surface of the first display module 211 and may be provided to dissipate the heat generated from the light emitting element of the first display module 211. According to an embodiment, the 1-1th heat dissipation plate 221 may be disposed on the rear surface of the first display module 211 by, e.g., an adhesive member (not shown). The 1-1th heat dissipation plate 221 may be formed of any thermally conductive material having good heat conductivity, e.g., aluminum (Al) or an aluminum alloy. The 1-1th heat dissipation plate 221 may be formed in the shape of a flat plate (plate) (or thin film, or sheet) having a wide area. According to an embodiment, at least a portion of the 1-1th heat dissipation plate 221 may come in contact with at least a portion of the housing (e.g., the housing 20 of FIG. 1) of the electronic device 10 or at least a portion of the supporting member 300, and the 1-1th heat dissipation plate 221 may dissipate the heat generated by the light emitting devices of the first display panel module 211 through the housing 20 or the supporting member 300.

The first power/data reception circuit board 241 may be disposed on the rear surface of the 1-1th heat dissipation plate 221 and performs data transmission/reception and power transmission/reception with the power/data transmission circuit board 400. The first power/data reception circuit board 241 is described below in greater detail with reference to FIG. 3.

The first display panel module 201 may be connected together with other display panel modules (e.g., 202, 203, and 204) to form the display panel module set 200. The description of each component of the first display panel module 201 may be applied to each component of the other display panel modules (e.g., 202, 203, and 204).

The supporting member 300 may be disposed on or adjacent to the rear surface of the display panel module set 200, and may be configured to contact and support at least a portion of the display panel module set 200. According to an embodiment, the supporting member 300 may include at least a portion of a housing (e.g., the housing 20 of FIG. 1). According to an embodiment, the supporting member 300 may serve, for example, as a kind of bracket inside the housing (e.g., the housing 20 of FIG. 1). According to an embodiment, the supporting member 300 may be configured in a wide and flat plate shape, as illustrated in FIG. 2, or with a combination of at least two members physically spaced apart from each other although not shown.

The supporting member 300 may define a space (e.g., a first space 301 or a second space 302) surrounded by the supporting member 300 and other components inside the electronic device 10, e.g., the display panel module set 200, and the power/data transmission circuit board 400. At least some components of the power/data transmission circuit board 400 and/or the display panel module set 200 may be disposed on the spaces 301 and 302.

As described below, the supporting member 300 may include a first supporting member (e.g., the first supporting member 310 of FIG. 3) for supporting each of the display panel module set 200 and the power/data transmission circuit board 400 between the display panel module set 200 and the power/data transmission circuit board 400 and a second supporting member (e.g., the second supporting member 320 of FIG. 3) disposed on the rear surface of the power/data transmission circuit board 400.

The power/data transmission circuit board 400 may be disposed on or adjacent to the rear surface of the supporting member 300. The power/data transmission circuit board 400 may include components (e.g., a resonator, an antenna, and various electronic components) for data transmission/reception and power transmission/reception between the display panel module sets 200. For example, the power/data transmission circuit board 400 may include a transmission resonator 410 (e.g., a coil) for transmitting/receiving power to/from the display panel module set 200 and a first antenna 430 for transmitting/receiving data to/from the display panel module set 200 formed thereon.

According to an embodiment, the transmission resonator 410 included in the power/data transmission circuit board 400 of the disclosure may be formed to be coupled to a plurality of reception resonators included in the display panel module set 200. In other words, according to an embodiment, there may be provided a structure in which one transmission resonator is coupled with a plurality of reception resonators. According to an embodiment, power consumption may be different for each of the display panel modules 201, 202, 203, and 204 of the display panel module set 200, and thus it may be significant to effectively supply or distribute power to the display panel modules 201, 202, 203, and 204. The supply or distribution of the power is described below in greater detail with reference to FIGS. 10A and 10B.

Figure 3:
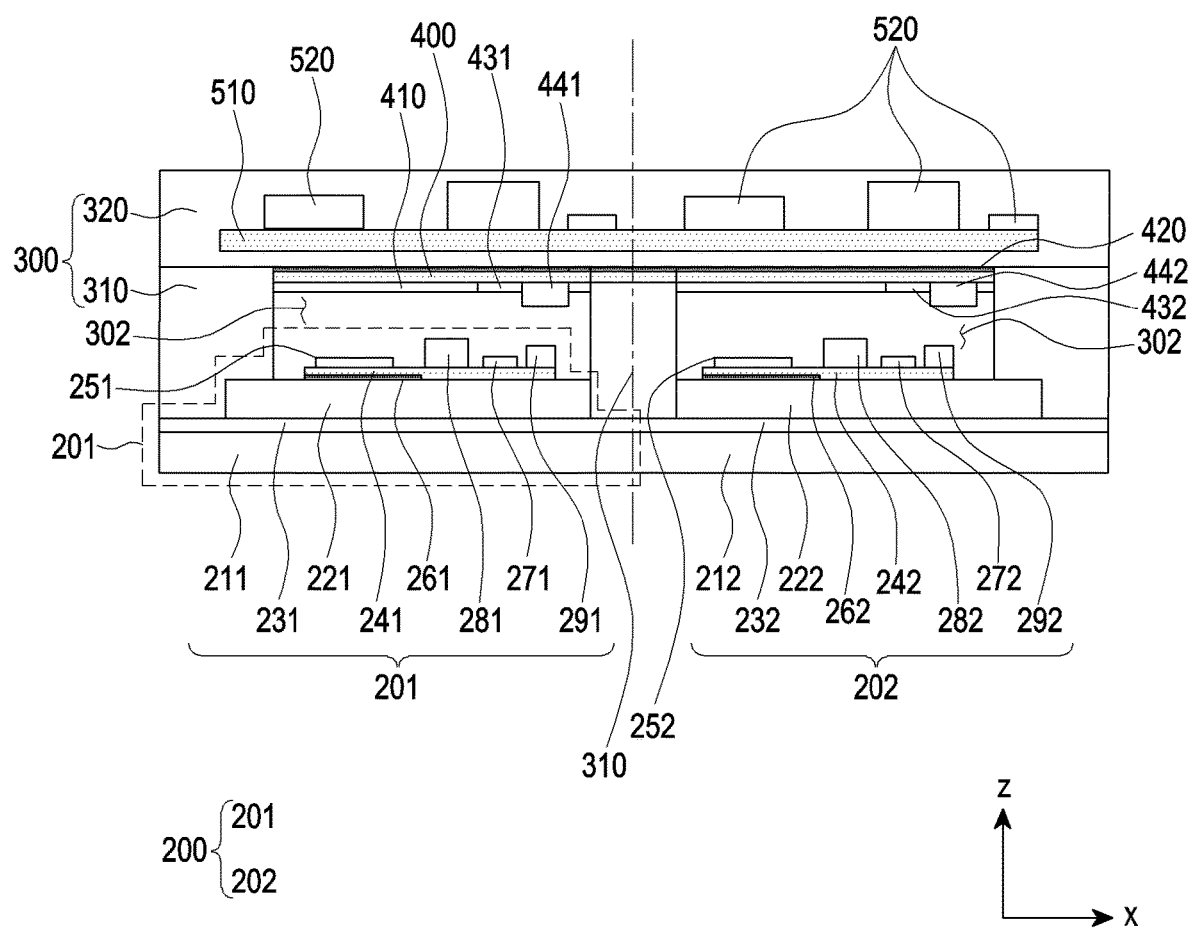
FIG. 3 is a cross-sectional view illustrating an example electronic device according to various embodiments.

FIG. 3 is a cross-sectional view illustrating an example electronic device according to various embodiments. A contactless connection between the display panel module set 200 and the power/data transmission circuit board 400 according to an embodiment is described in greater detail with reference to FIG. 3. The 'contactless connection' may refer, for example, to the display panel module set 200 and the power/data transmission circuit board 400 implementing a certain function (e.g., data and/or power transmission), the connection structures for implementing the function are physically spaced apart from each other.

Referring to FIG. 3, at least some components of the display panel module set 200 and at least some components of the power/data transmission circuit board 400 may be disposed on the second space 302 surrounded by the supporting member 300 and other components inside the electronic device, e.g., the power/data transmission circuit board 400 and the display panel module set 200. For example, the reception resonators 251 and 252, the second shielding members 261 and 262, the second antennas 271 and 272, the reception modules (e.g., including various circuitry) 281 and 282, and electronic components (e.g., including various circuitry) 291 and 292 included in the display panel module set 200 may be disposed on the second space 302. As another example, the transmission resonator 410, first shielding member 420, first antennas 431 and 432, and transmission modules 441 and 442, included in the power/data transmission circuit board 400 may be disposed on the second space 302.

The electronic device 10 uses the antennas (e.g., the first antennas 431 and 432 and the second antennas 271 and 272) included in the power/data transmission circuit board 400 and the display panel module set 200 to perform data transmission/reception. According to an embodiment, the second antennas 271 and 272 of the display panel module set 200 and the first antennas 431 and 432 of the power/data transmission circuit board 400 may be configured to operate in an ultra-high frequency band of several GHz to several tens of Ghz to implement short-range transmission and a data security function and secure a wide bandwidth.

According to an embodiment, the electronic device 10 may be formed to be capable of power transmission/reception as well as data transmission/reception. The electronic device 10 uses the reception resonators 251 and 252 included in the display panel module set 200 and the transmission resonator 410 included in the power/data transmission circuit board 400 to transmit/receive power in the contactless connection structure.

The reception resonators 251 and 252 may be disposed to face the power/data transmission circuit board 400 on the space 302 provided by the supporting member 300, and the transmission resonator 410 may be disposed to face the display panel module set 200 on the space provided by the supporting member 300.

The reception resonators 251 and 252 and the transmission resonator 410 may transfer power to the wireless power reception device using one or more of an inductive coupling method based on the electromagnetic induction phenomenon generated by the wireless power signal and an electromagnetic resonance coupling method based on the electromagnetic resonance phenomenon generated by a specific frequency of wireless power signal. The wireless power transmission method by electromagnetic induction is a technology that wirelessly transmits power using a primary conductive pattern and a secondary conductive pattern, and this may refer, for example, to delivery of power as a varying magnetic field generated by electromagnetic induction in one conductive pattern induces a current at the other conductive pattern. The wireless power transmission method by the resonance coupling method may refer, for example, to delivery of power from the wireless power transmitter by the electromagnetic resonance generated in the electronic device by the wireless power signal transmitted from the wireless power transmitter.

Magnetic shielding members (e.g., the second shielding member 261 and the first shielding member 420) may be disposed around the reception resonators 251 and 252 and the transmission resonator 410, e.g., on the rear surface or its adjacent side surface of the reception resonators 251 and 252 and the transmission resonator 410. The magnetic shielding members 261 and 420 may increase the efficiency of power transmission and block the leakage of the magnetic field generated between the reception resonators 251 and 252 and the transmission resonator 410, thereby preventing and/or reducing deterioration of data transmission/reception efficiency using the second antennas 271 and 272 for data reception and the first antennas 431 and 432 for data transmission.

The power transmission using the reception resonators 251 and 252 and the transmission resonator 410 may be performed simultaneously with, or at a different time from, or independently or dependently from, the data transmission using the second antennas 271 and 272 for data reception and the first antennas 431 and 432 for data transmission.

According to an embodiment, the display panel module set 200 may include reception modules 281 and 282 including, e.g., a drive IC for transmitting/receiving data, and various electronic components 291 and 292 (e.g., a rectifying circuit, DC/DC converter, and power management IC (PMIC)). The power/data transmission circuit board 400 may include transmission modules 441 and 442 including drive ICs for data transmission/reception and various electronic components 520 (e.g., power amplifiers or PMICs).

According to an embodiment, in addition to the above-described electronic components, the electronic device 10 may further include a power circuit board 510 provided on one side (e.g., the second supporting member 320) of the electronic device 10 and various electronic components 520 (e.g., a BOM, GaN or inductor) mounted on the power circuit board 510.

Figure 4:
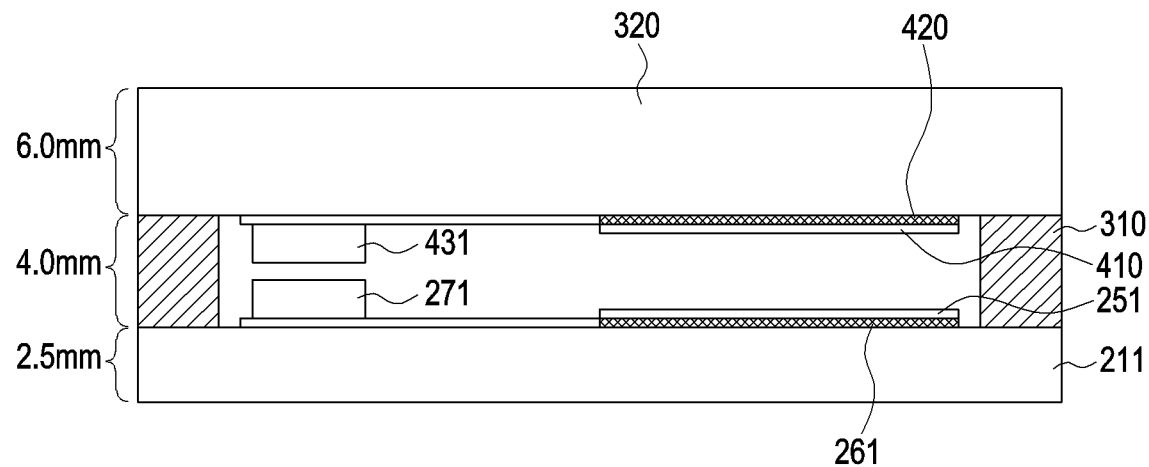
FIG. 4 is a cross-sectional view illustrating an example electronic device according to various embodiments.

FIG. 4 is a cross-sectional view illustrating an example electronic device according to various embodiments.

Referring to FIG. 4, as described above in connection with FIG. 3, the transmission resonator 410 and the reception resonator 251 may be spaced apart by a predetermined distance (e.g., 4.0 mm or less) by the first supporting member 310. The transmission resonator 410 may supply wireless power to the reception resonator 251. Magnetic shielding members (e.g., the second shielding member 261 and the first shielding member 420) may be disposed on the rear or adjacent side surfaces of the transmission resonator 410 and/or the reception resonator 251. The magnetic shielding members 261 and 420 may increase the efficiency of power transmission and block the leakage of the magnetic field generated between the reception resonators 251 and 252 and the transmission resonator 410, thereby preventing and/or reducing deterioration of data transmission/reception efficiency using the second antenna 271 for data reception and the first antenna 431 for data transmission.

The first antenna 431 for data transmission and the second antenna 271 for data reception may be spaced apart by a predetermined distance (e.g., 1.0 mm or less) by the first supporting member 310. The first antenna 431 for transmission may transmit data (e.g., image data and/or control data) to the second antenna 271 for reception.

According to an embodiment, the electronic device 10 (e.g., the display device) may reduce the thickness of the display device by wirelessly transmitting power and data without a cable connection. For example, when a cable is used to transmit and receive data or power between the power/data transmission circuit board 400 and the display panel module set 200 in the display device 10, a separate bridge for connecting the cable and the connector may be required, leading to the need for securing a separate space. According to an embodiment, when transmitting power and/or data wirelessly without a cable, the thickness of the display device may be minimized and/or reduced as illustrated in FIG. 4.

Figure 5:
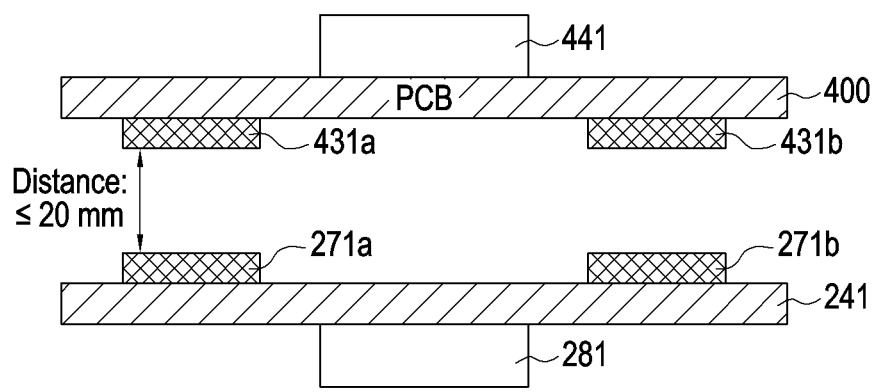
FIG. 5 is a cross-sectional view illustrating an example electronic device according to various embodiments.

FIG. 5 is a cross-sectional view illustrating an example electronic device according to various embodiments.

Referring to FIG. 5, a plurality of first antennas 431a and 431b for transmission may be disposed on the transmission circuit board 400, and a transmission module 441 may be disposed to process the transmission signals to be transmitted through the first antennas 431a and 431b. A plurality of second antennas 271a and 271b for reception may be disposed on the reception circuit board 241, and a reception module 281 may be disposed to process the reception signals received through the second antennas 271a and 271b.

When the transmission module 441 and the reception module 281 use a short-range ultra-high rate data transmission scheme of an ultra-high frequency band (e.g., 60 GHz), the distance between the first antennas 431a and 431b and the second antennas 271a and 271b may, for example, be maintained as 20 mm or less. Use of a short-range communication scheme of an ultra-high frequency band as illustrated in FIG. 5 enables transmission/reception of image data at a high speed (e.g., 2 Gbps or higher) while minimizing and/or reducing the thickness of the display device.

Figure 6:
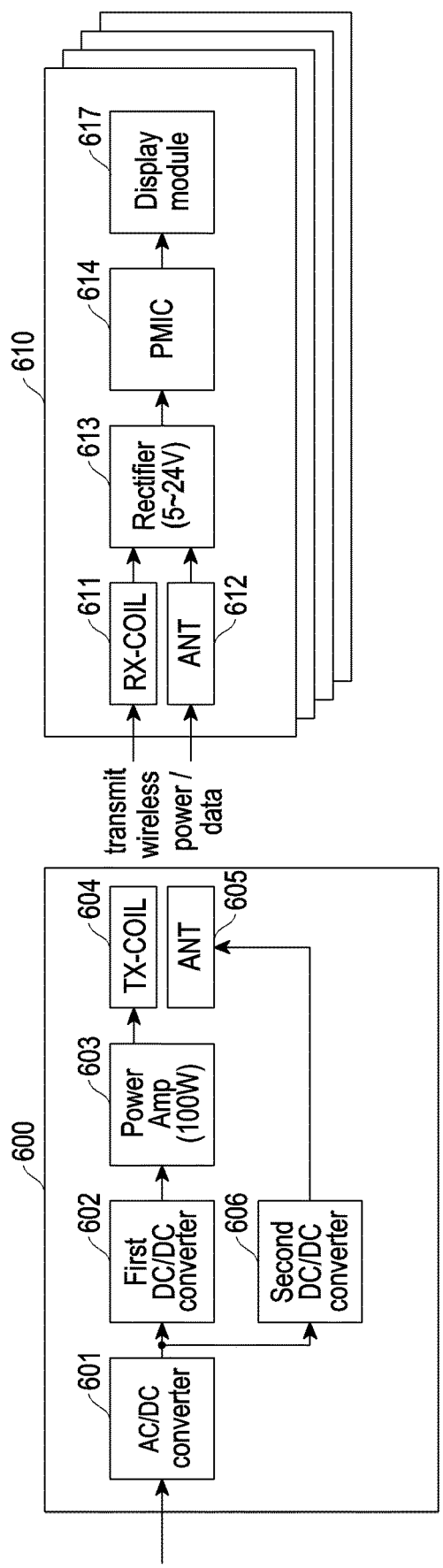
FIG. 6 is a block diagram illustrating an example configuration of an electronic device according to various embodiments.

FIG. 6 is a block diagram illustrating an example configuration of an example electronic device according to various embodiments.

Referring to FIG. 6, a transmission circuit unit 600 (e.g., the power/data transmission circuit board 400) may include an AC/DC converter 601, a first DC/DC converter 602, a second DC/DC converter 606, a power amplifier 603, a transmission coil 604 (e.g., the transmission resonator 410), and a transmission antenna 605 (e.g., the first antenna 430). The display panel module 610 (e.g., the display panel module 201) may include a reception coil 611 (e.g., the reception resonator 251), a reception antenna 612 (e.g., the second antenna 271), a rectifier 613, a PMIC 614, and a display module (e.g., including a display) 617 (e.g., the display module 211).

The transmission circuit unit 600 may convert the received AC power into a DC signal through the AC/DC converter 601. For example, the first AC/DC converter 601 may convert the received 220V AC signal into a 100V DC signal. The first DC/DC converter 602 may convert the signal converted from the AC/DC converter 601 into a signal having a required power level. The power amplifier 603 may receive the DC power output from the first DC/DC converter 602 and convert it into AC power amplified to a desired size (e.g., 100 W). According to an embodiment, the AC power converted through the power amplifier 601 may be wirelessly transmitted through the transmission coil 604. According to an embodiment, the second DC/DC converter 606 may convert the signal converted from the AC/DC converter 601 into a signal having a required power level (e.g., 1.8V or 3.3V) and output the same. According to an embodiment, the DC power output from the second DC/DC converter 606 may be supplied to the transmission antenna 605.

The reception coil 611 of the display panel module 610 may receive the AC signal transmitted from the transmission coil 604 of the transmission circuit unit 600, and convert the received AC signal into a DC signal (e.g., a DC signal of 5V to 24V) through the rectifier 613. The signal rectified to the DC signal through the rectifier 613 may be DC/DC converted into a desired voltage level (e.g., 17V, 14.6V, 2V, or 1.8V) by the PMIC 614 and then transmitted to each component of the display module 617. Although not illustrated in FIG. 6, in addition to the PMIC 614, a DC/DC converter may be added for DC/DC conversion into a desired voltage level (e.g., 5V or 12V), or a low drop-out (LDO) regulator may be added for DC/DC conversion into a desired voltage level (e.g., 12V or 6V).

According to an embodiment, as illustrated in FIG. 6, the power transmitted through one transmission coil 604 of one transmission circuit unit 600 may be supplied by the power level necessary for each of the plurality of display panel modules 610.

Figure 7:
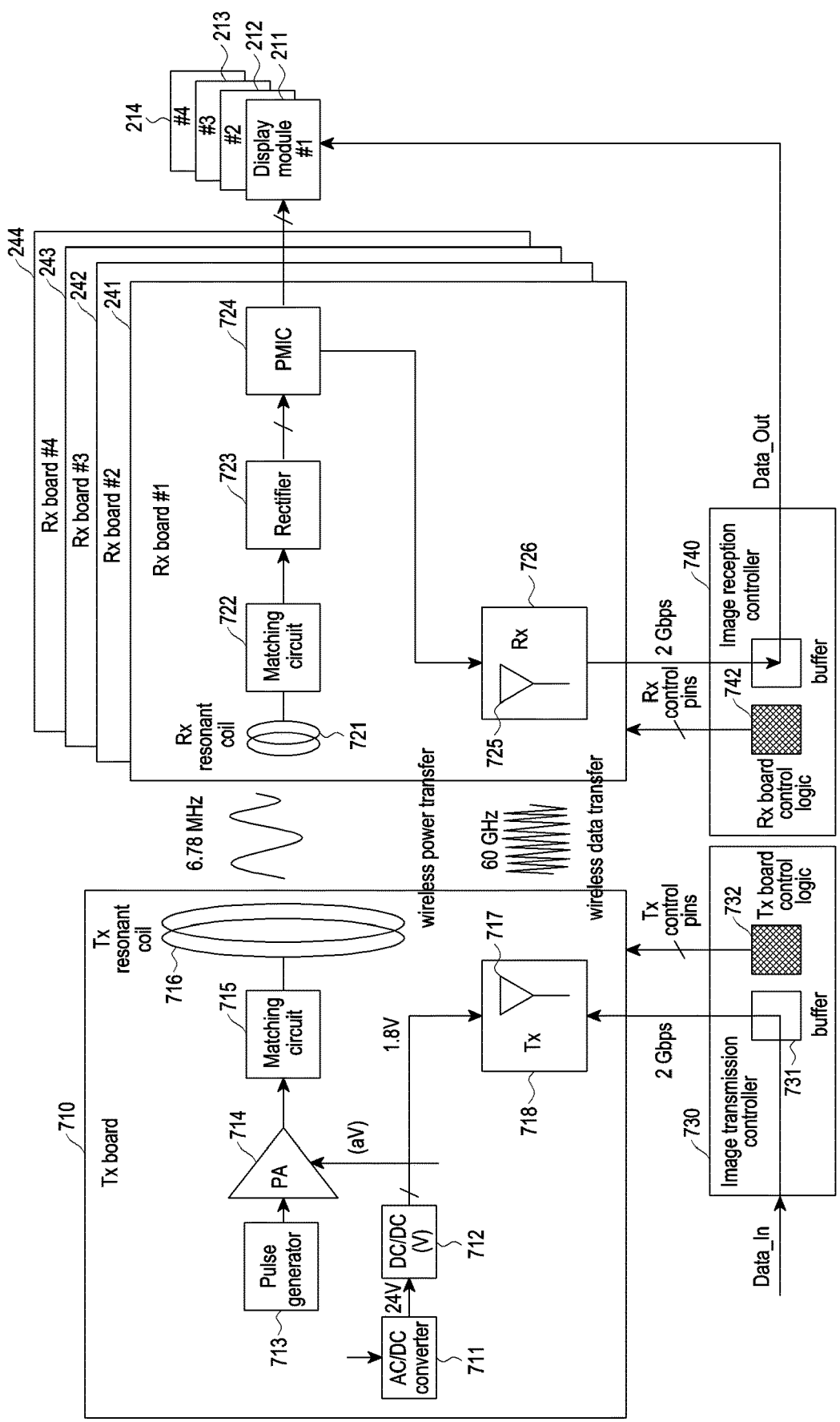
FIG. 7 is a circuit diagram illustrating an example electronic device according to various embodiments.

FIG. 7 is a circuit diagram illustrating an example electronic device according to various embodiments.

Referring to FIG. 7, a transmission board 710 (e.g., the transmission circuit unit 600 of FIG. 6) may include a pulse generator 713, a power amplifier 714, a matching circuit 715, a resonant coil 716 for transmission (e.g., the transmission resonator 410), an AD/DC converter 711, a DC/DC converter 712, and a transmission circuit 718 including a transmission antenna 717 (e.g., the first antenna 431).

The pulse generator 713 may generate a signal having a frequency (e.g., 6.78 MHz) (e.g., a carrier frequency) set to transmit power through the resonant coil 716 for transmission. The signal generated through the pulse generator 713 may be amplified into a signal having a desired level through the power amplifier 714. The power amplifier 714 may amplify the signal generated through the pulse generator 713 input by the voltage generated through the AC/DC converter 711 and the DC/DC converter 712 into a preset level. The signal amplified through the power amplifier 714 may be transmitted through the matching circuit 715 and then the resonant coil 716 for transmission. The power generated through the AC/DC converter 711 and the DC/DC converter 712 may be supplied as driving power for the transmission circuit 718. According to an embodiment, an image transmission controller 730 may temporarily store the data (e.g., image data) to be transmitted to a reception board 241 (e.g., the display panel module 610 of FIG. 6) in a buffer 731 and then transmitted to the transmission circuit 718. The transmission circuit 718 may be driven by the power (e.g., 1.8V power) supplied from the DC/DC converter 712 to transmit the data provided from the image transmission controller 730 through the transmission antenna 717. The image transmission controller 730 may transmit the control signal output from the transmission control circuit 732 to the transmission board 710 to control a power transmission/reception operation and/or a data transmission/reception operation of the transmission board 710. The image transmission controller 730 may, for example, be implemented as a field programmable gate array (FPGA), and the transmission control circuit 732 may, for example, be implemented as programmable logic.

Each of the reception boards 241, 242, 243, and 244 (e.g., the display panel modules 201, 202, 203, and 204 of FIG. 6) may include a resonant coil 721 for reception (e.g., the reception resonator 251), a matching circuit 722, a rectifier 723, a PMIC 724, and a reception circuit 726 including a reception antenna 725 (e.g., the second antenna 271). According to an embodiment, the power transmitted through the resonant coil 716 for transmission may be received through the resonant coil 721 for reception. The power received by the resonant coil 721 for reception may be transmitted to the rectifier 723 through the matching circuit 722. The rectifier 723 may rectify the received AC signal into a DC signal. The PMIC 724 may receive the DC signal rectified through the rectifier 723 and output a signal having a desired size (e.g., 1.8V, 2V, 14.6V, or 17V). For example, the PMIC 724 may, for example, supply a 1.8V signal to the reception circuit 726. The reception circuit 726 is driven by the power (e.g., a 1.8V signal) transmitted from the PMIC 724, signal-processing the signal received through the reception antenna 725 into image data, and then transmitting the same to the image reception controller 740. The image reception controller 740 may transmit the image data received from the reception circuit 726 to a corresponding display module 211. The image reception controller 740 may transmit the control signal output from the reception control circuit 742 to the reception board 241 to control a power transmission/reception operation and/or a data transmission/reception operation of the reception board 241. The image reception controller 740 may be implemented as an FPGA, and the reception control circuit 742 may be implemented as programmable logic.

Figure 8:
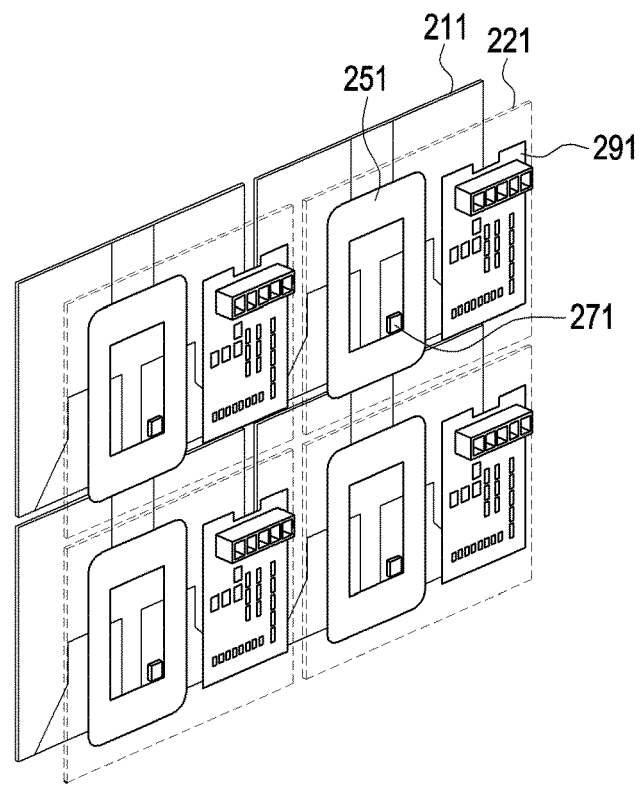
FIG. 8 is a perspective view illustrating an example power/data reception circuit board according to various embodiments.

FIG. 8 is a perspective view illustrating an example power/data reception circuit board according to various embodiments.

Referring to FIG. 8, each display panel module 201 may include a display module 211, a first heat dissipation plate 221, a reception resonator 251, a second antenna 271, and an electronic component 291. According to an embodiment, the display panel module 201 may be configured as a single integrated module.

Figure 9:
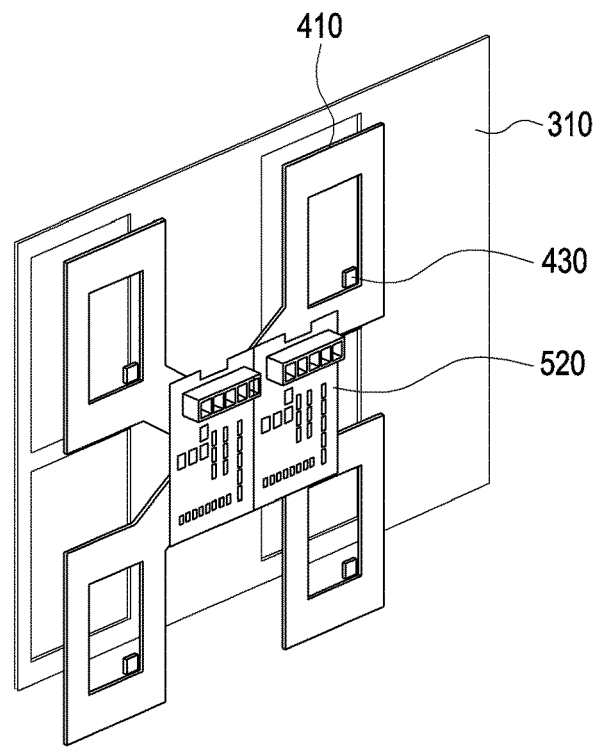
FIG. 9 is a perspective view illustrating an example power/data transmission circuit board according to various embodiments.

FIG. 9 is a perspective view illustrating an example power/data transmission circuit board according to various embodiments.

Referring to FIG. 9, a transmission circuit board 400 may include a transmission resonator 410 and a first antenna 430, and may be disposed adjacent to the first supporting member 310 and various electronic components 520.

Referring to FIGS. 8 and 9 together, the transmission resonator 410 may simultaneously supply power to a plurality of reception resonators 251, 252, 253 and 254. According to an embodiment, the transmission resonator 410 may be configured in the same or similar size and/or shape to the plurality of reception resonators 251, 252, 253, and 254 to reduce electromagnetic interference (EMI) and increase power transmission efficiency. The image data transmitted in real time may be different for each display module 211, 212, 213, and 214. Since the power consumed by each display module 211, 212, 213, and 214 may be different as the image data differs, simultaneous transmission of wireless power from one transmission resonator 410 to the plurality of reception resonators 251, 252, 253, and 254 allows for an effective distribution of power to each module, according to an embodiment. This is described below in further detail.

Figure 10A:
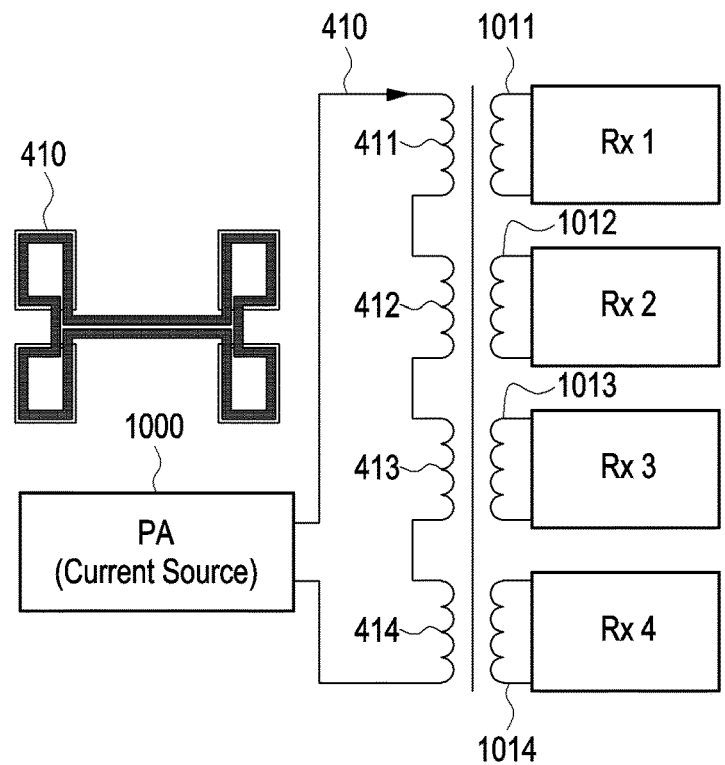
FIG. 10A is a diagram illustrating an example transmission resonator and a reception resonator according to various embodiments.
Figure 10B:
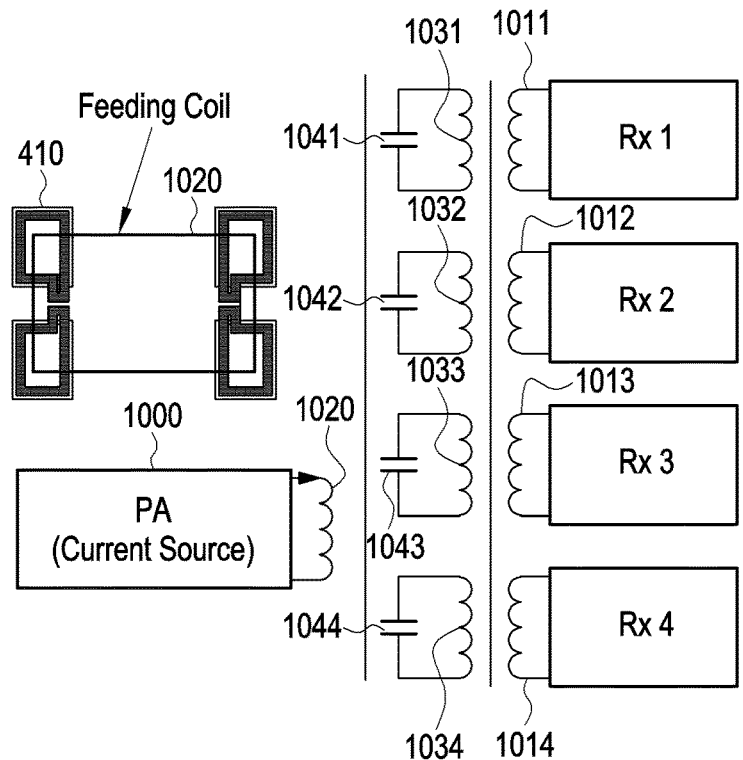
FIG. 10B is a diagram illustrating an example transmission resonator and a reception resonator according to various embodiments.

FIGS. 10A and 10B are diagrams illustrating an example transmission resonator and an example reception resonator, respectively, according to various embodiments.

FIG. 10A is a circuit diagram illustrating an example of the transmission resonator and the reception resonator described above in connection with FIGS. 8 and 9. According to an embodiment, the power supplied from a current source 1000 may be transmitted to the transmission resonator 410. The transmission resonator 410 may include a plurality of series-connected resonant coils 411, 412, 413, and 414. The first resonant coil 411 of the transmission resonator 410 may transmit power to the first reception resonator 1011, the second resonant coil 412 may transmit power to the second reception resonator 1012, the third resonant coil 413 may transmit power to the third reception resonator 1013, and the fourth resonant coil 414 may transmit power to the fourth reception resonator 1014.

Referring to FIG. 10B, the power supplied from the current source 1000 may be transmitted to a plurality of transmission resonators through a loop-shaped feeding coil 1020. Each of the transmission resonators may include at least one coil 1031, 1032, 1033, and 1034 and at least one capacitor 1041, 1042, 1043, and 1044. For example, the first transmission resonator may transmit power to the first reception resonator 1011 through the first coil 1031, the second transmission resonator may transmit power to the second reception resonator 1012 through the second coil 1032, the third transmission resonator may transmit power to the third reception resonator 1013 through the third coil 1033, and the fourth transmission resonator may transmit power to the fourth reception resonator 1014 through the fourth coil 1034. When the feeding coil 1020 is added as illustrated in FIG. 10B, the coupling coefficient between the transmission resonator and the reception resonator may be increased, and the EMI may be reduced, thus raising power transmission efficiency.

According to an embodiment, the display modules 211, 212, 213, and 214 may require a pulsed current having the same voltage at repetitive periods, such as 60 fps or 120 fps. Since the load impedance of each display module varies over a wide range over time, the transmission resonator 410 may be designed to cover a wide range of load variations, according to an embodiment. As described above in connection with FIGS. 2 and 3, since the thickness of the display device reduces so that wireless communication in a long distance between the transmission circuit board and the display module is not easy, it may be hard to control load variations by a separate wireless communication module.

According to an embodiment, the transmission resonator 410 may be configured to transmit power based on a constant current (CC) mode, and each of the reception resonators 251, 252, 253, and 254 may be configured to receive power based on a constant voltage (CV) mode. As the transmission resonator 410 is set to the CC mode, the current may remain constant while the voltage may be varied according to the load impedance. In contrast, as each of the reception resonators 251, 252, 253, and 254 operates in the CV mode, the voltage may be constant, and the current may be automatically varied. According to the circuit characteristics as described above, a constant current may be supplied to the transmission resonator 410 regardless of the load impedance. When a constant current is supplied to the transmission resonator 410, the reception voltage at each of the reception resonators may appear constant regardless of the load impedance. For example, when the current supplied to the transmission resonator 410 remains constant as 1A, the mutual inductance is 955n, and the resonant frequency fs is 6.78 MHz, the voltage of each reception resonator may be calculated as in Equation 1.

$$Vrx = jwMI = 2 \times \pi \times 6.78 \text{ M (Hz)} \times 955n(H) \times 1(A) = 40 \text{ V} \quad \text{[Equation 1]}$$

It may be identified from Equation 1 that when the current supplied to the transmission resonator 410 is constant as 1A by operating in the CC mode, the voltage of each reception resonator may be constant as 40V and it may operate in the CV mode. According to an embodiment, the average power consumed by the display module corresponding to each reception resonator may be about 30 W, but since the waveform of the required load current appears in the form of an irregular pulse, the impedance of the display panel may have a wide variable impedance range from 0.6[=12V/20 A] ohm to ∞ ohm depending on the operation time. When power is supplied in the form of FIGS. 8 and 9 described above, it may be necessary to supply power corresponding to the impedance that sharply varies over time for each display module. For example, aside from the loss of the resonator and the power converter, the current source 1000 that supplies power to the transmission resonator 410 should be able to supply power in the range from 12V*20 A=240 W to 0W without a separate control signal. According to an embodiment, when the current supplied to the transmission resonator 410 is constant by operating in the CC mode, the power corresponding to the rapidly changing impedance in each display module may be supplied without a separate control signal.

Figure 11:
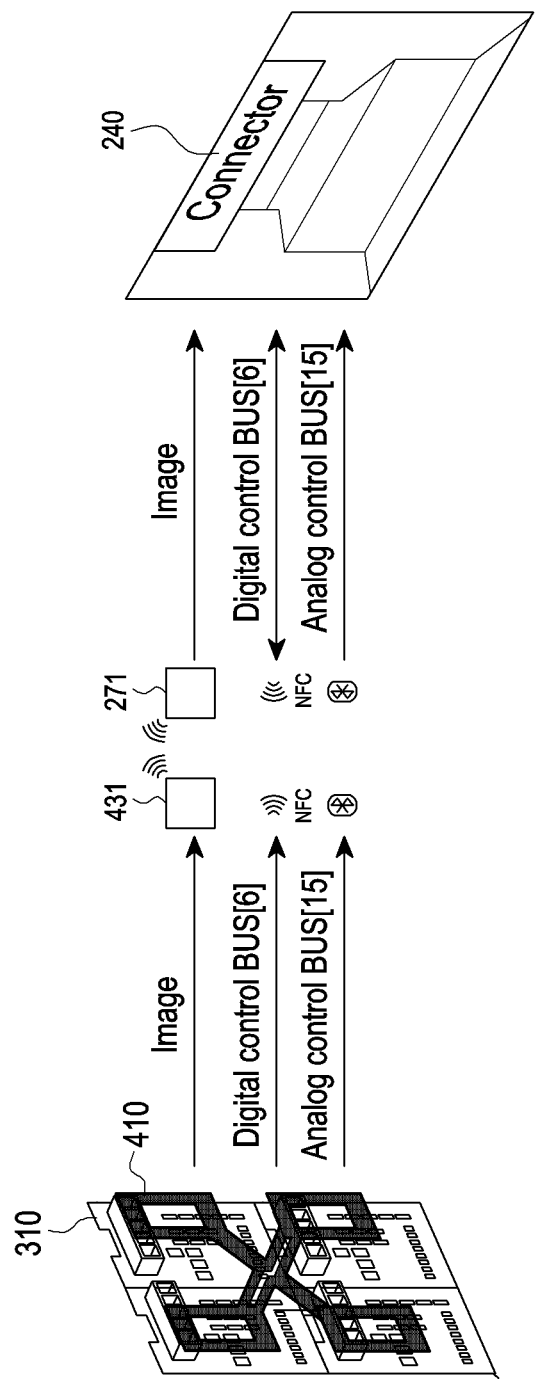
FIG. 11 is a diagram illustrating an example method for transmitting data from a transmission circuit board to a reception circuit board according to various embodiments.
Figure 12:
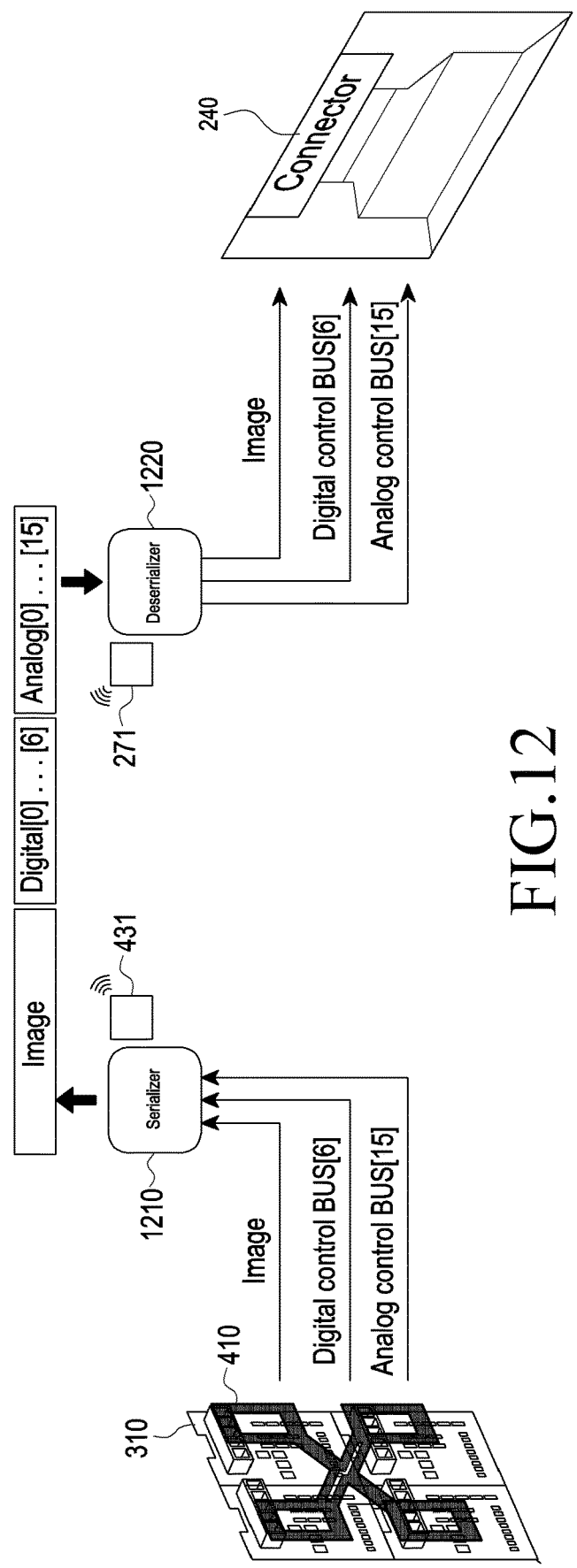
FIG. 12 is a diagram illustrating an example method for transmitting data from a transmission circuit board to a reception circuit board according to various embodiments.

FIGS. 11 and 12 are diagrams illustrating an example method for transmitting data from a transmission circuit board to a reception circuit board according to various embodiments.

Referring to FIG. 11, as described above, the transmission resonator 410 may supply necessary power to the reception circuit board 240 of each display panel module 200. According to an embodiment, image data may be transmitted from the first antenna 431 to the second antenna 271, and control data for controlling the image data may be transmitted via a separate short-range communication scheme (e.g., near-field communication (NFC), Bluetooth, or Bluetooth low energy (BLE)). For example, as illustrated in FIG. 11, control data may be simultaneously transmitted in parallel with image data by a separate short-range communication scheme.

According to an embodiment, referring to FIG. 12, upon transmitting the image data and the control data, the image data and the control data may be sequentially transmitted through a serializer 1210. Upon reception, the image data and the control data may be separated and processed in parallel through a deserializer 1220.

Figure 13:
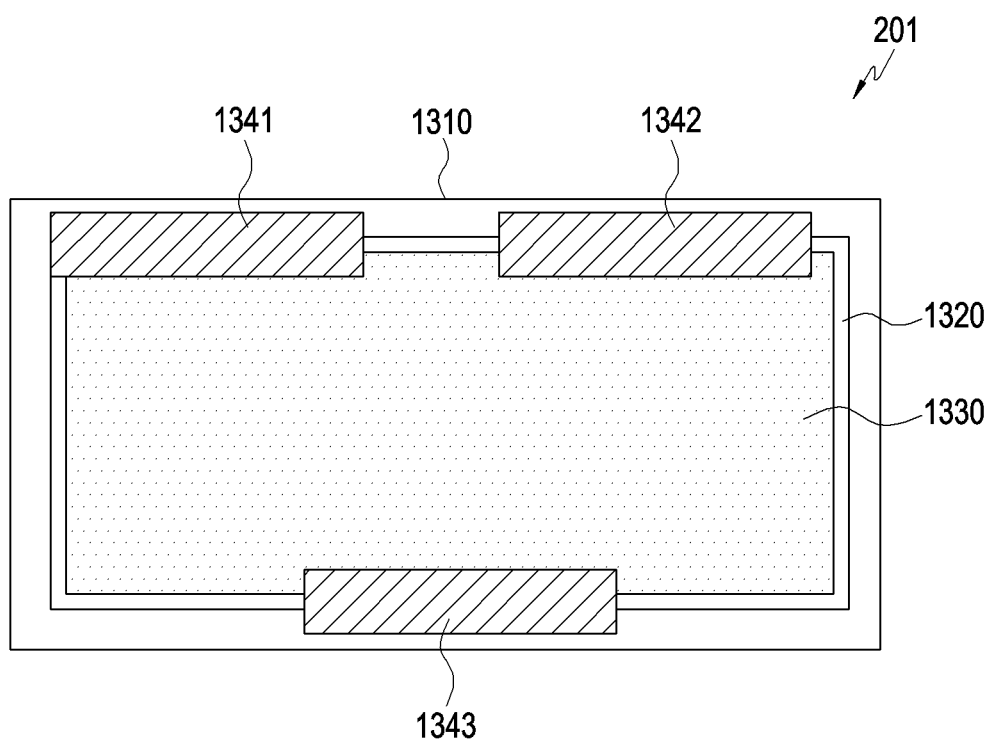
FIG. 13 is a diagram illustrating an example method for manufacturing a display panel module according to various embodiments.

FIG. 13 is a diagram illustrating an example method for manufacturing a display panel module according to various embodiments.

Referring to FIG. 13, the display panel module 201 may be manufactured in a glass shape. According to an embodiment, the display panel module 201 may be produced by bonding a glass 1310, a heat dissipation plate 1320, a printed circuit board (PCB) 1330, and flexible printed circuit boards (FPCBs) 1341, 1342, and 1343. For example, the glass 1310 and the PCB 1330 may be coupled through the FPCBs 1341, 1342, and 1343, and anisotropic conductive film (ACF) ultrasonic bonding and solder ball bonding may be used.

FIGS. 14, 15, 16, and 17 are diagrams illustrating an example configuration of image data according to various embodiments.

Figure 14:
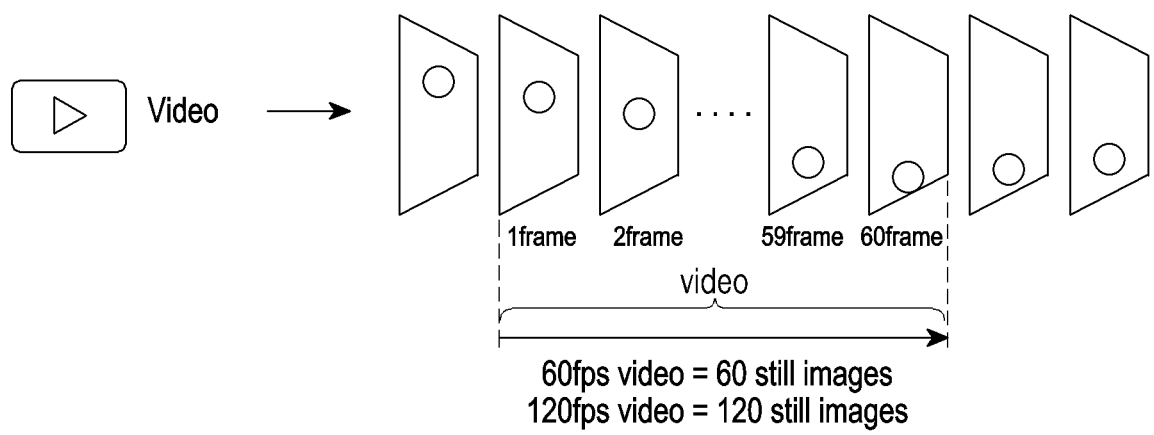
FIG. 14 is a diagram illustrating an example configuration of image data according to various embodiments.

Referring to FIG. 14, the image data supplied to each display module 210 may be a 60 fps (frame per second) or 120 fps video. The transmission processing operation of the image data may be performed by repeating the operations of configuring image data for each image frame, transmitting the image data to the display module, and displaying the same. According to an embodiment, the image data of each image frame may have a matrix structure of a two-dimensional array. For example, in the case of a full HD screen, the image data may include RGB information on a 1920×1080 array of pixels. The control data may include information for adjusting the image data in addition to the image data. For example, the control data may include flag, gamma, and contrast information for classifying data formats.

Figure 15:
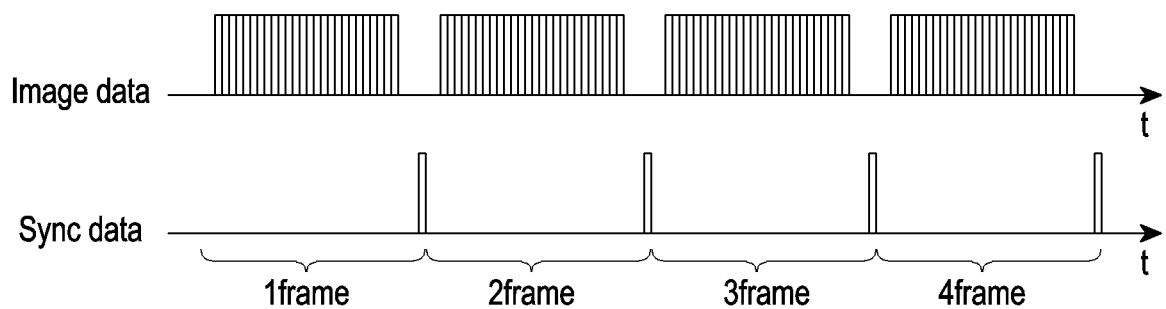
FIG. 15 is a diagram illustrating an example configuration of image data according to various embodiments.
Figure 16:
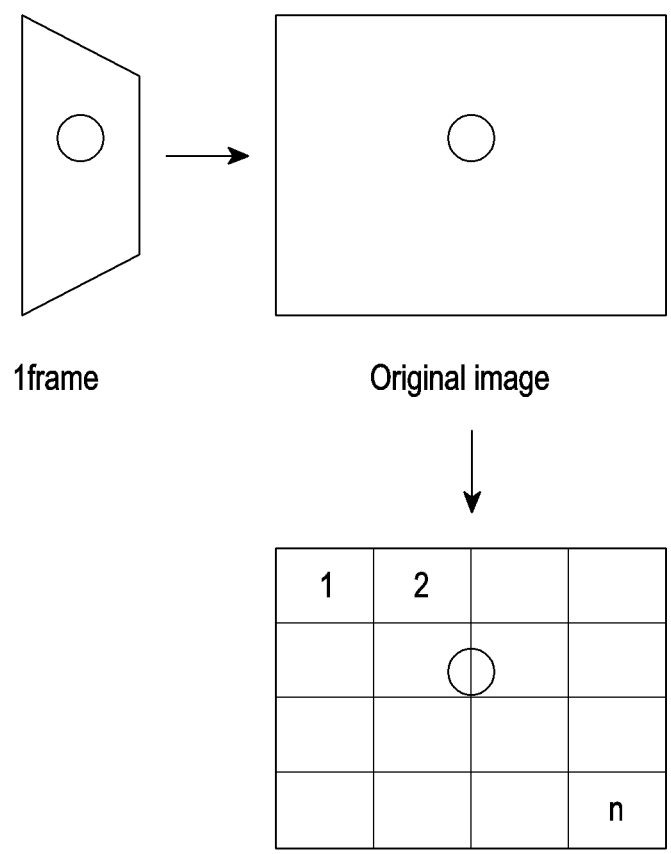
FIG. 16 is a diagram illustrating an example configuration of image data according to various embodiments.
Figure 17:
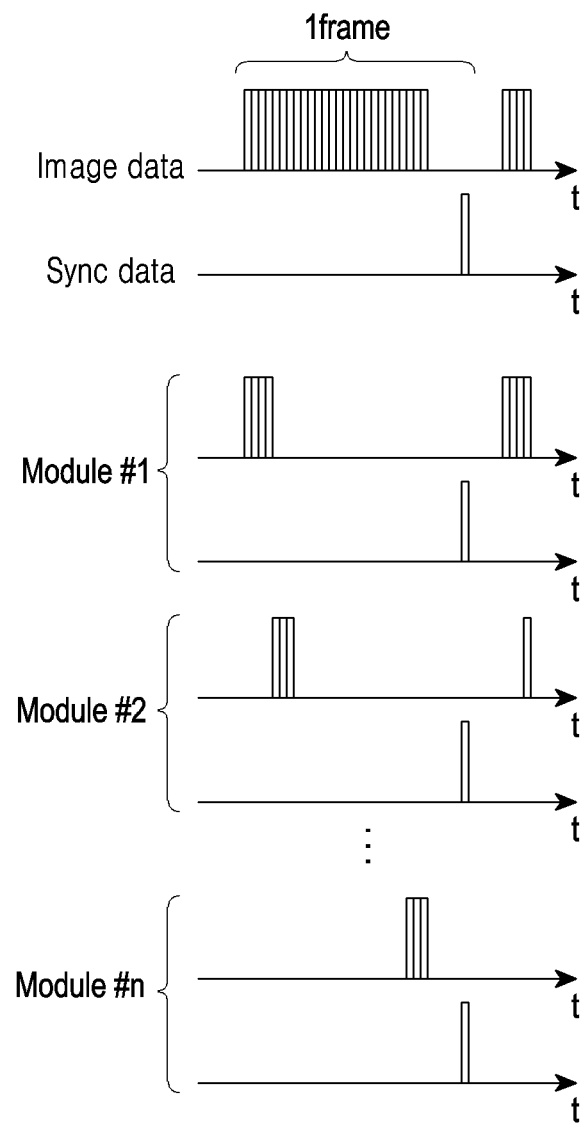
FIG. 17 is a diagram illustrating an example configuration of image data according to various embodiments.

According to an embodiment, referring to FIG. 15, synchronization (sync) data may be transmitted between frames of image data. Referring to FIG. 16, one image frame may be transmitted separately for each of the plurality of display modules. Referring to FIG. 17, the image data received by each display module may be sequentially transmitted over time. As described above, since the image data received by each display module differs over time, the level of power consumed by each display module may also vary according to each time.

According to an embodiment, as described above with reference to FIGS. 8 and 9, as one transmit resonator 410 operates in the CC mode, the power variably consumed in each reception resonator 251, 252, 253, and 254 may be effectively distributed without a separate control signal.

According to an example embodiment, an electronic device comprises: a housing, a cover glass, a plurality of display panels disposed adjacent to a rear surface of the cover glass in the housing, a plurality of first heat dissipation plates disposed adjacent to rear surfaces of the plurality of display panels in the housing, a plurality of power/data reception circuit boards disposed adjacent to rear surfaces of the plurality of first heat dissipation plates in the housing, a support configured to support at least a portion of the plurality of power/data reception circuit boards, and a power/data transmission circuit board having at least a portion contacting and supported by the support and spaced apart by a predetermined distance from the plurality of power/data reception circuit boards in a space provided by the support. The power/data transmission circuit board includes: a plurality of first antennas corresponding to a plurality of second antennas included in each of the plurality of power/data reception circuit boards and a transmission resonator corresponding to a plurality of reception resonators included in each of the plurality of power/data reception circuit boards.

According to an example embodiment, the plurality of display panels, the plurality of first heat dissipation plates, and the plurality of power/data reception circuit boards may comprise a display panel module set.

According to an example embodiment, at least one display panel, at least one first heat dissipation plate, and at least one power/data reception circuit board may comprise a display panel module.

According to an example embodiment, the transmission resonator may be coupled with the plurality of reception resonators and be configured to wirelessly transmit power to the plurality of reception resonators.

According to an example embodiment, the transmission resonator may be configured to transmit power based on a constant current (CC) mode. Each of the plurality of reception resonators may be configured to receive power based on a constant voltage (CV) mode.

According to an example embodiment, a shape of the transmission resonator may correspond to a shape of the plurality of reception resonators.

According to an example embodiment, each of the plurality of first antennas may be configured to transmit image data to a respective one of the plurality of second antennas.

According to an example embodiment, each of the plurality of first antennas may be configured to transmit control data for controlling an output of the image data to a respective one of the plurality of second antennas.

According to an example embodiment, the power/data transmission circuit board may include a first short-range communication module comprising circuitry. The plurality of power/data reception circuit boards may include a plurality of second short-range communication modules comprising circuitry. Control data for controlling an output of the image data may be transmitted from the first short-range communication module to the plurality of second short-range communication modules.

According to an example embodiment, the electronic device may further comprise a plurality of second heat dissipation plates disposed between the plurality of display panels and the plurality of first heat dissipation plates.

According to an example embodiment, the electronic device may further comprise a first shield disposed adjacent to the transmission resonator.

According to an example embodiment, the electronic device may further comprise a plurality of second shields disposed adjacent to each of the plurality of reception resonators.

According to an example embodiment, each of the plurality of display panels may include a micro light emitting diode (LED) panel.

According to an example embodiment, a display panel module comprises: a display panel, a first heat dissipation plate disposed adjacent to a rear surface of the display panel, and a power/data reception circuit board disposed adjacent to a rear surface of the first heat dissipation plate. The power/data reception circuit board includes an antenna and a reception resonator.

According to an example embodiment, the reception resonator may be coupled with a transmission resonator and be configured to wirelessly receive power.

According to an example embodiment, the reception resonator may be configured to receive power based on a constant voltage (CV) mode.

According to an example embodiment, the antenna may be configured to receive image data.

According to an example embodiment, the antenna may be configured to receive control data for controlling an output of the image data.

According to an example embodiment, the power/data reception circuit board may include a short-range communication module comprising circuitry. The short-range communication module may be configured to receive control data for controlling an output of the image data.

According to an example embodiment, the display panel module may further comprise a second heat dissipation plate disposed between the display panel and the first heat dissipation plate.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software including one or more instructions that are stored in a storage medium (e.g., internal memory or external memory) that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   a housing;
   a cover glass;
   a plurality of display panels disposed in the housing, the plurality of display panels being disposed adjacent to a rear surface of the cover glass;
   a plurality of first heat dissipation plates disposed in the housing, the plurality of first heat dissipation plates being disposed adjacent to rear surfaces of the plurality of display panels;
   a plurality of power/data reception circuit boards disposed in the housing, the plurality of power/data reception circuit boards being disposed adjacent to rear surfaces of the plurality of first heat dissipation plates in the housing;
   a support disposed in the housing and configured to support at least a portion of the plurality of power/data reception circuit boards; and
   a power/data transmission circuit board disposed in the housing, the power/data transmission circuit board having at least a portion supported by the support and spaced apart by a predetermined distance from the plurality of power/data reception circuit boards in a space provided by the support,
   wherein the power/data transmission circuit board includes a plurality of first antennas for wirelessly transmitting data to a plurality of second antennas included in the plurality of power/data reception circuit boards and a plurality of transmission resonators for wirelessly transmitting power to a plurality of reception resonators included in the plurality of power/data reception circuit boards,
   wherein the plurality of first antennas respectively correspond to the plurality of second antennas and
   wherein the plurality of transmission resonators respectively correspond to the plurality of reception resonators.

2. The electronic device of claim 1, wherein the plurality of display panels, the plurality of first heat dissipation plates, and the plurality of power/data reception circuit boards comprise a display panel module set.

3. The electronic device of claim 1, wherein at least one display panel of the plurality of display panels, at least one first heat dissipation plate of the plurality of first heat dissipation plates, and at least one power/data reception circuit board of the plurality of power/data reception circuit boards comprise a display panel module.

4. The electronic device of claim 1, wherein the plurality of transmission resonators is respectively is coupled with the plurality of reception resonators.

5. The electronic device of claim 4, wherein each of the plurality of transmission resonators is configured to transmit power based on a constant current (CC) mode, and wherein each of the plurality of reception resonators is configured to receive power based on a constant voltage (CV) mode.

6. The electronic device of claim 4, wherein a shape of the plurality of transmission resonators respectively corresponds to a shape of the plurality of reception resonators.

7. The electronic device of claim 1, wherein each of the plurality of first antennas is configured to transmit image data to a respective one of the plurality of second antennas.

8. The electronic device of claim 7, wherein each of the plurality of first antennas is configured to transmit control data for controlling an output of the image data to a respective one of the plurality of second antennas.

9. The electronic device of claim 7, wherein the power/data transmission circuit board includes:
 a first short-range communication module comprising circuitry,
 wherein the plurality of power/data reception circuit boards include a plurality of second short-range communication modules comprising circuitry, and
 wherein control data for controlling an output of the image data is configured to be transmitted from the first short-range communication module to the plurality of second short-range communication modules.

10. The electronic device of claim 1, further comprising a plurality of second heat dissipation plates disposed between the plurality of display panels and the plurality of first heat dissipation plates.

11. The electronic device of claim 1, further comprising a shield disposed adjacent to the plurality of transmission resonators.

12. The electronic device of claim 1, further comprising a plurality of shields disposed adjacent to each of the plurality of reception resonators.

13. The electronic device of claim 1, wherein each of the plurality of display panels includes a micro light emitting diode (LED) panel.

14. A display panel module for an electronic device, the display panel module comprising:
 a display panel;
 a first heat dissipation plate disposed adjacent to a rear surface of the display panel; and
 a power/data reception circuit board disposed adjacent to a rear surface of the first heat dissipation plate, wherein the power/data reception circuit board is disposed in a housing of an electronic device, and
 a power/data transmission circuit board disposed in the housing,
 wherein the power/data transmission circuit board includes a first antenna for wirelessly transmitting data to a second antenna included in the power/data reception circuit board and a transmission resonator for wirelessly transmitting power to a reception resonator included in the power/data reception circuit board,
 wherein the first antenna corresponds to the second antenna, and
 wherein the transmission resonator corresponds to the reception resonator.

15. The display panel module of claim 14, wherein the reception resonator is coupled with the transmission resonator.

16. The display panel module of claim 15, wherein the reception resonator is configured to receive power based on a constant voltage (CV) mode.

17. The display panel module of claim 14, wherein the second antenna is configured to receive image data.

18. The display panel module of claim 17, wherein the second antenna is configured to receive control data for controlling an output of the image data.

19. The display panel module of claim 17, wherein the power/data reception circuit board includes a short-range communication module comprising circuitry, and wherein the short-range communication module is configured to receive control data for controlling an output of the image data.

20. The display panel module of claim 14, further comprising a second heat dissipation plate disposed between the display panel and the first heat dissipation plate.

\* \* \* \* \*